United States Patent [19]

Brumm

[11] 4,416,301
[45] Nov. 22, 1983

[54] ANNULAR PISTON VALVE

[75] Inventor: Richard S. Brumm, Orinda, Calif.

[73] Assignee: Grove Valve and Regulator Company, Oakland, Calif.

[21] Appl. No.: 275,924

[22] Filed: Jun. 22, 1981

[51] Int. Cl.³ .................................. F16K 15/02
[52] U.S. Cl. ............................... 137/220; 137/529; 137/535; 137/536
[58] Field of Search ............... 137/219, 220, 529, 535, 137/536, 540

[56] References Cited

U.S. PATENT DOCUMENTS

| 2,416,787 | 3/1947 | White | 137/219 X |
| 2,798,446 | 7/1957 | Endrezze | 137/529 X |
| 3,605,788 | 9/1971 | Brown | 137/220 |
| 4,116,212 | 9/1978 | Cooper | 137/220 |
| 4,117,859 | 10/1978 | Illy | 137/219 |
| 4,137,933 | 2/1979 | Culpepper | 137/219 |

FOREIGN PATENT DOCUMENTS

| 619085 | 3/1961 | Italy | 137/219 |
| 251489 | 8/1948 | Switzerland | 137/540 |
| 317945 | 8/1929 | United Kingdom | 137/219 |
| 327472 | 4/1930 | United Kingdom | 137/219 |
| 1104308 | 2/1968 | United Kingdom | 137/529 |
| 643697 | 1/1979 | U.S.S.R. | 137/219 |

*Primary Examiner*—Gerald A. Michalsky
*Attorney, Agent, or Firm*—Melvin R. Stidham

[57] ABSTRACT

A valve construction wherein a streamlined flow diverter is centered within a cylindrical valve body. A slidable annular seat ring is biased upstream to seal against a seating surface on the inwardly tapered downstream side of the flow diverter and is biased by fluid pressure so that the valve opens when line pressure exceeds the control pressure. The inner contour of the retractable seat ring and the tapered outer contour of the downstream side of the flow diverter are such that the minimum flow area between them occurs a short distance downstream of the seating surface and is thereafter maintained or slightly increased gradually to an abrupt termination of the tapered surface.

6 Claims, 2 Drawing Figures

U.S. Patent
Nov. 22, 1983
4,416,301
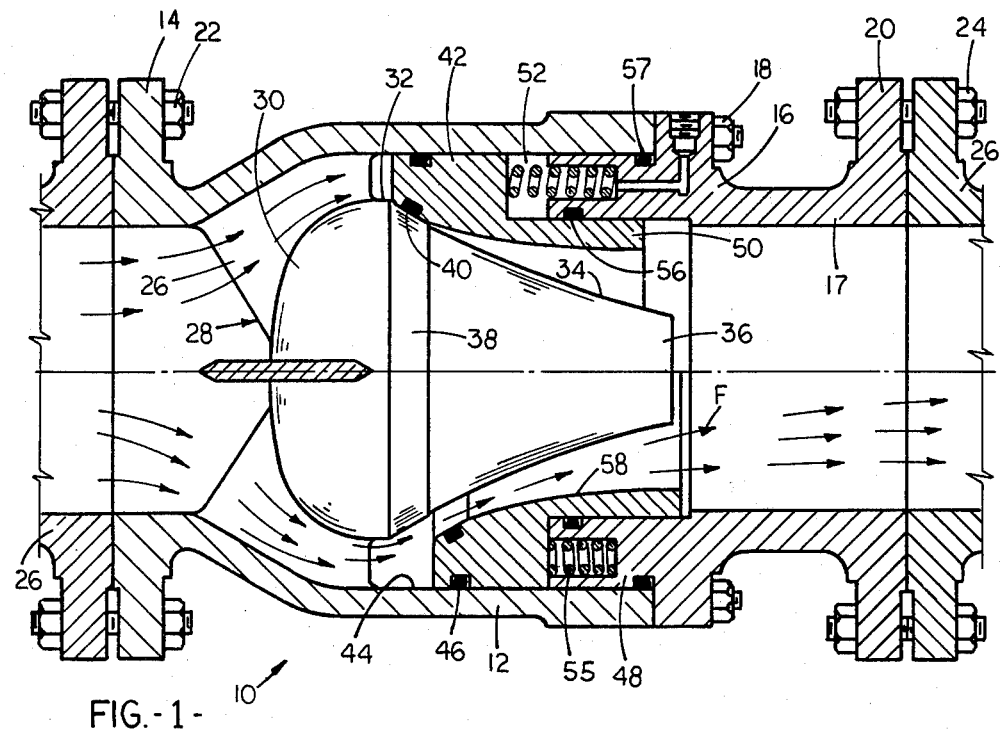
FIG.-1-
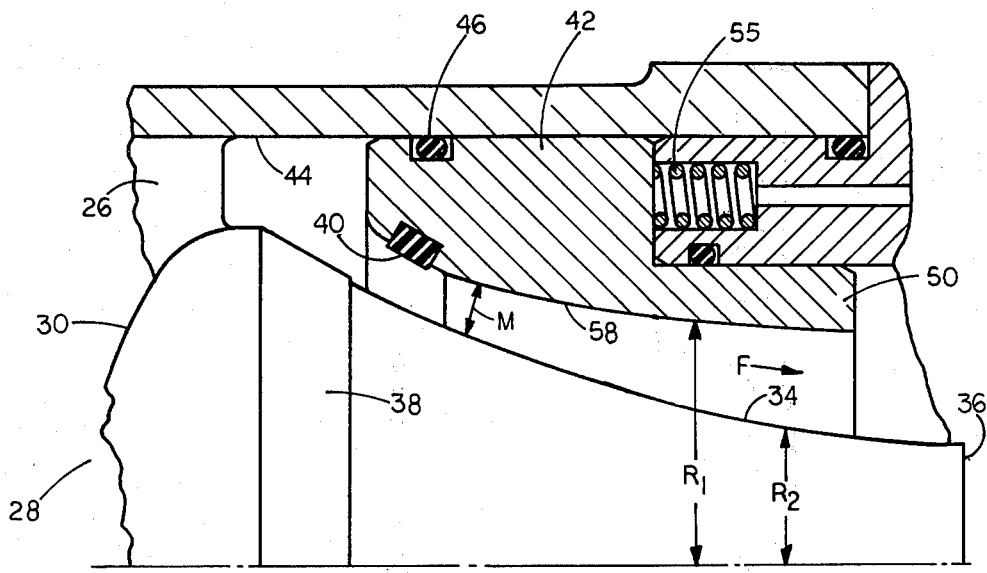
FIG.-2-

ANNULAR PISTON VALVE

BACKGROUND OF THE INVENTION

In liquid flow systems, when the liquid flows through relatively restricted passages, as is common in flow through a valve, cavitation may result. Cavitation can cause excessive noise, and even damage to the valve and downstream piping. The Vena Contracta, or region of minimum flow stream area, can only occur at or downstream of the point of minimum passage area. As a result, cavitation often takes place at the most sensitive area of a valve, i.e. in the area where relatively soft, or machine finished, sealing surfaces are situated in the flow restricting portion of the valve.

OBJECTS OF THE INVENTION

It is an object of this invention to provide a valve design wherein cavitation is delayed so that, if it occurs, it occurs downstream of the sensitive valve seating areas.

It is a further object of this invention to provide a valve with a flow passage configuration wherein cavitation-produced bubbles are directed radially inward of the pipe walls.

It is a further object of this invention to provide a valve having flow passage configurations wherein the area increases gradually to approach pipeline diameter.

Other objects and advantages of this invention will become apparent from the description to follow, particularly when read in conjunction with the accompanying drawing.

SUMMARY OF THE INVENTION

In carrying out this invention, there is provided a generally cylindrical valve body having an annular piston seat ring, which retracts in a downstream direction away from a valve seat by pipeline pressure, when that pressure overcomes a fixed biasing pressure. Centered in the valve body is a streamlined flow diverter having a rounded upstream face which with the cylindrical inner surface of the valve body, forms an annular flow passage around it. From a maximum diameter, the flow diveter is reduced in diameter across a finished seating surface, which when the valve is closed, is engaged by a resilient seal carried on the annular piston seat ring. The outer surface of the flow diverter, and the inner surface of the annular piston seat ring are configured so that the minimum flow area of the annular flow passage between them occurs downstream of the machined seating area and then remains constant or gradually increases until a liquid stream is projected inward downstream toward the axis of the pipe.

BRIEF DESCRIPTION OF THE DRAWING

In the drawing:

FIG. 1 is a view in section of the piston valve of this invention; and

FIG. 2 is an enlarged partial section view illustrating the flow path with the valve open.

DESCRIPTION OF A PREFERRED EMBODIMENT

Referrring now to FIG. 1 with greater particularity, the annular piston valve 10 of this invention comprises a generally cylindrical body 12 with an integral flange 14 at one end, and an end closure 16 bolted at 18 at the other end. The end closure 16 with flow passageway 17 is flanged to adapt the housing 12 for bolting at 22 and 24 into a pipeline 26, wherein normal fluid flow is from left to right as indicated by the arrows F.

Secured centrally within the housing 12, as by means of vanes 26, is a bulb-like flow diverter 28 having a rounded upstream surface 30, which diverts the fluid radially outward in a smooth transition into an annular path around the diverter 28. Then, from the largest diameter 32, the flow diverter tapers gradually inward in a smooth profile 34 until it terminates abruptly further downstream in a radial face 36.

Just downstream of the largest diameter 32 of the flow diameter the tapered surface is machine finished at 38 to provide a sealing surface in cooperation with a resilient seal 40 carried at the upstream portion of a sliding annular seat ring 42 which is slidably carried in the cylindrical inner surface 44 of the housing 12, an outer O-ring 46 being provided to prevent a leak path around the seat ring 42.

An annular extension 48 on the end closure 16 slidably receives a tail extension 50 on the seat ring 42 and forms, between it and the seat ring 42, a fluid pressure chamber 52 into which a fluid at predetermined pressure may be introduced at 54. A plurality of light springs 55 bias the seat ring 42 upstream to insure sealing when fluid pressure is in balance. The fluid chamber 52 is sealed off by suitable means such as O-rings 56 and 57. The seal ring 56 seals on a diameter substantially equal to the sealing diameter of the main seal 40. Hence, the set pressure in the chamber 52, and the line pressure acting outside of the main seal ring 40 are asserted against equal areas and the seat ring 42 will back away to enable flow when line pressure exceeds the set pressure by the force of the springs 55.

As a specific feature of this invention, the contours of the tapering downstream portion 34 of the flow diverter 28 and that of the inner surface 58 of the seat ring 42 are such that the minimum passage area M (FIG. 2) in all positions of the seat ring 42 is situated downstream of the resilient main seal 40, as well as the machined seating area 38 on the flow diverter 28, ensuring that cavitation, if such occurs, will only occur downstream of these sensitive areas. Downstream of the minimum flow area site M the surfaces 34 and 58 diverge, as indicated, enough to at least compensate for the reduction in area occasioned by reduction in diameter. That is, since the annular area at any cross-section area is proportional to the differences between the squares of the diameter, the diameter of the flow diverter restoring surface 34 is reduced more sharply than that of the ring 58 so that the annular area between them does not decrease and, in fact, may increase slightly from upstream to downstream. In the meantime, since both surfaces 58 and 34 are progressively decreasing, in diameter and approaching the axis of the flow passage 17, the fluid F is directed inward away from the walls of the end closure flow passage 17 and the pipeline 26, wherein damage could be caused by cavitation. Also, with the flow diverter restoring surface 34 terminating abruptly in the radial surface 36, the flow diverter 28 is simply removed from the area downstream wherein cavitation is likely to occur, again avoiding its erosive effects.

While this invention has been described in conjunction with a preferred embodiment thereof, it is obvious that modifications and changes therein may be made to those skilled in the art to which it pertains, without departing from the spirit and scope of this invention, as defined by the claims appended hereto.

What is claimed as invention is:

1. A valve body having a generally cylindrical inner surface;
   a rigid piston seat ring slidable in and along said inner surface;
   a streamlined flow diverter of varying circular cross-section fixed in said valve body coaxially with said inner surface and having a rounded upstream surface increasing to a maximum diameter and a tapered surface downstream thereof;
   a narrow band machined around said tapered surface immediately downstream of said maximum diameter forming a seating surface; and
   a resilient main seal ring carried on the leading portion of said seat ring engageable with said seating surface;
   an internal shoulder in and around said valve body downstream of said seating surface forming a reduced diameter interior surface downstream therefrom;
   an external shoulder on and around said piston seat ring facing said internal shoulder; and
   means biasing between said shoulders to urge said piston seat ring into sealing engagement with said seating surface;
   the outer surface of said flow diverter and the inner surface of said piston seat ring being contoured so that, when said seat ring is retracted to withdraw said main seal ring from said seating surface, the flow area between said piston seat ring and said flow diverter diminishes to a location slightly downstream of said main seal ring and then does not thereafter diminish over said tapered surface.

2. The valve construction defined by claim 1 wherein:
   said tapered surface terminates abruptly in a circular end surface.

3. The valve construction defined by claim 2 wherein:
   said end surface is generally radially planar.

4. The valve construction defined by claim 2 wherein:
   said tapered surface and the inner surface of said seat ring are contoured so that the flow area between them downstream of said location increases gradually to said end surface.

5. The valve construction defined by claim 1 wherein:
   said tapered surface and the inner surface of said seat ring are contoured so that the difference in their diameters increases to at least compensate for a reduction in area attributable to decreased diameters.

6. The valve construction defined by claim 1 including:
   a trailing annular extension on said seat ring slidable in said interior surface;
   the outer surface of said annular extension being of substantially the diameter of said seal ring so that the area of said external shoulder is substantially equal to the annular area at said leading portion of the piston seat ring around said main seal ring;
   means sealing between said extension and said interior surface; and
   an outer seal ring around said seat ring upstream of said external shoulder;
   said biasing means including:
   means for introducing a fluid at predetermined pressure between said shoulders.

* * * * *